United States Patent
Granstrom

(10) Patent No.: US 11,727,164 B1
(45) Date of Patent: Aug. 15, 2023

(54) THREE-DIMENSIONAL ROAD GEOMETRY ESTIMATION

(71) Applicant: EMBARK TRUCKS, INC., San Francisco, CA (US)

(72) Inventor: Karl Granstrom, San Francisco, CA (US)

(73) Assignee: EMBARK TRUCKS INC., San Francisco, CA (US)

( * ) Notice: Subject to any disclaimer, the term of this patent is extended or adjusted under 35 U.S.C. 154(b) by 0 days.

(21) Appl. No.: 17/949,693

(22) Filed: Sep. 21, 2022

(51) Int. Cl.
 G06F 30/13 (2020.01)
 G01C 21/00 (2006.01)
 G06F 111/10 (2020.01)

(52) U.S. Cl.
 CPC ......... *G06F 30/13* (2020.01); *G01C 21/3815* (2020.08); *G01C 21/3819* (2020.08); *G06F 2111/10* (2020.01)

(58) Field of Classification Search
 CPC . G06F 30/13; G06F 2111/10; G01C 21/3815; G01C 21/3819; G01C 21/3822; G01C 21/3867
 See application file for complete search history.

(56) References Cited

U.S. PATENT DOCUMENTS

| | | | | |
|---|---|---|---|---|
| 7,152,022 | B1* | 12/2006 | Joshi | G06T 11/203 703/2 |
| 10,718,618 | B2* | 7/2020 | Bitan | G01C 21/10 |
| 2003/0100992 | A1* | 5/2003 | Khosla | G01S 7/411 701/514 |
| 2020/0132476 | A1* | 4/2020 | Roeth | G06V 20/588 |

OTHER PUBLICATIONS

Khosla; Accurate forward road geometry estimation for collision warning applications; IEEE IP International Conference on Intelligent Transportation Systems Sep. 3-6, 2002, Singapore (Year: 2002).*
Bétaille et al.; Creating Enhanced Maps for Lane-Level Vehicle Navigation; IEEE Transactions on Intelligent Transportation Systems, vol. 11, No. 4, Dec. 2010 (Year: 2010).*
Da Silva et al.; Sparse Road Network Model for Autonomous Navigation Using Clothoids; IEEE Transactions on Intelligent Transportation Systems, vol. 23, No. 2, Feb. 2022 (Year: 2022).*
Chen et al.; High-precision lane-level road map building for vehicle navigation; IEEE/ION Position, Location and Navigation Sym., 2010; pp. 1035-1042 (Year: 2010).*
Su et al.; High-Resolution Representation for Mobile Mapping Data in Curved Regular Grid Model; Sensors 19, No. 24; 2019 (Year: 2019).*

* cited by examiner

*Primary Examiner* — Michael J Zanelli
(74) *Attorney, Agent, or Firm* — Buckley, Maschoff & Talwalkar LLC

(57) ABSTRACT

A system and method including identifying lane line data associated with a road within the sensor data; modelling a geometry of the road as a sequence of road segments, each road segment being defined by parameters including a curvature rate and a road grade rate; generating, based on a mathematical representation of the modelled road geometry, an approximation of each road segment; and generating, based on the generated approximation of each road segment, a three-dimensional representation of the road including the sequence of segments.

20 Claims, 15 Drawing Sheets

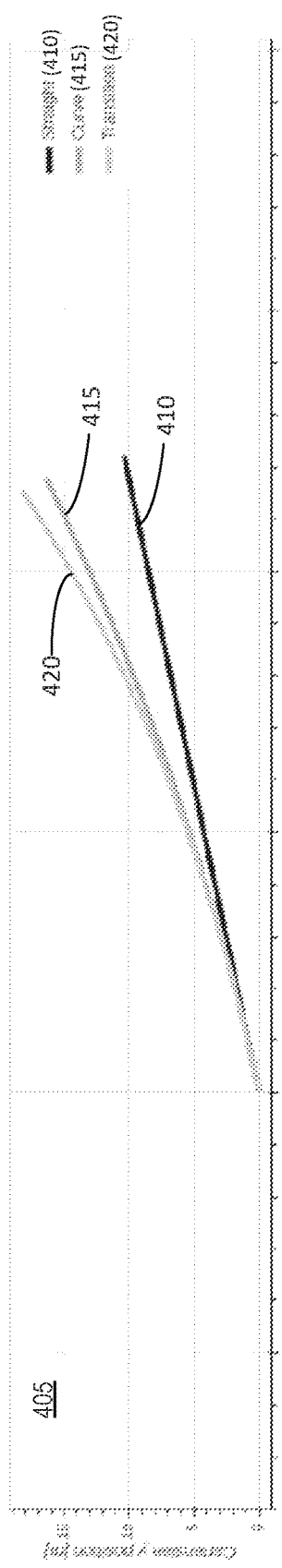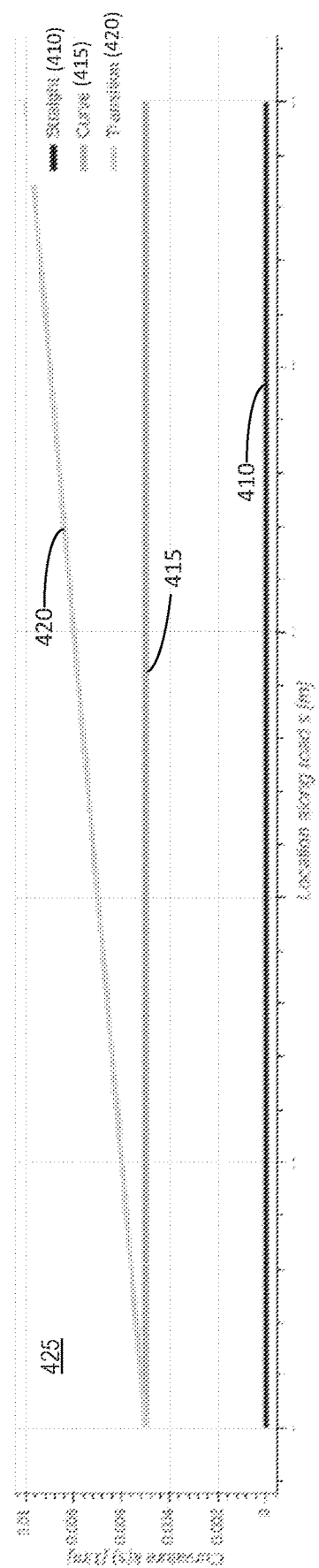
FIG. 4A
FIG. 4B

THREE-DIMENSIONAL ROAD GEOMETRY ESTIMATION

BACKGROUND

Autonomous vehicles are motor vehicles capable of performing one or more necessary driving functions without a human driver's input, generally including Level 2 or higher capabilities as generally described in SAE International's J3016 Standard and including, in certain embodiments, self-driving trucks that include sensors, devices, and systems that may function together to generate sensor data indicative of various parameter values related to the position, speed, operating characteristics of the vehicle, and a state of the vehicle, including data generated in response to various objects, situations, and environments encountered by the autonomous vehicle during the operation thereof.

An autonomous vehicle may rely on sensors such as cameras, lidars, radars, inertial measurement units (IMUs), and the like to understand the road and the rest of the world around the vehicle without requiring user interaction. Accurate modelling of the road on which the autonomous vehicle operates is important so that, for example, the vehicle can safely navigate the road using the sensor readings (i.e., sensor data). Accurate modelling or estimation of the road can be critical for perception (computer vision), control, mapping, and other functions. Without proper modelling, an autonomous vehicle might have trouble staying within its lane, as well as additional problems such as steering and navigation.

Some prior road geometry estimation processes rely on mathematical approximations that incur significant approximation errors. Although such approximations might be acceptable in some applications or use cases, the high precision and safety-critical operations of autonomous vehicles require a high level of accuracy and minimal approximation errors.

As such, there exists a need for an efficient and robust system and method to accurately and efficiently estimate or model road geometry for the operation of an autonomous vehicle.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 4A is an illustrative plot of a position along an example road, in accordance with an example embodiment;

FIG. 4B is an illustrative plot of a curvature for an example road, in accordance with an example embodiment;

Figure 1:
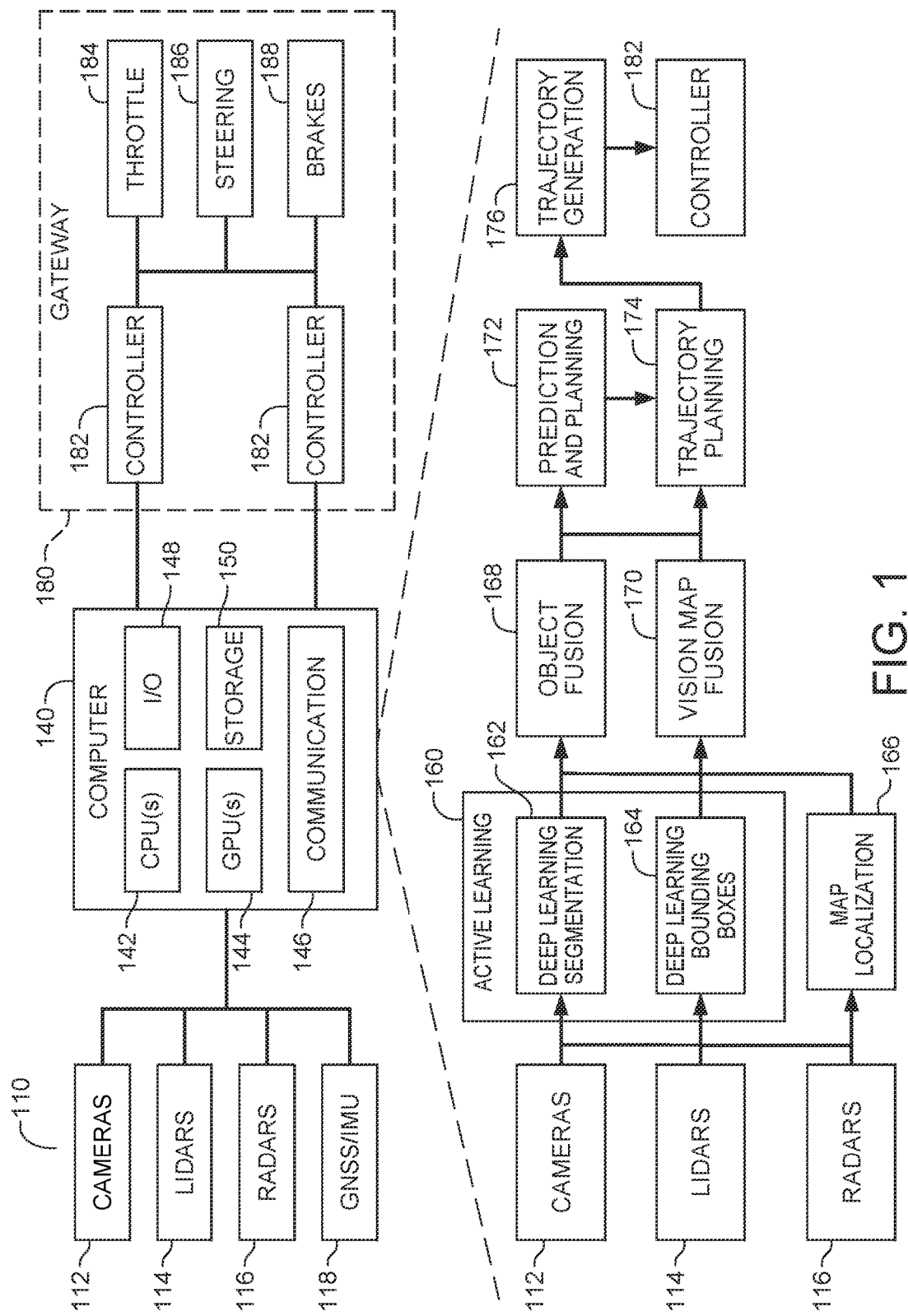
FIG. 1 is an illustrative block diagram of a control system that may be deployed in a vehicle, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. Further, as will become apparent to those skilled in the art upon reading the present disclosure, embodiments of the present invention may be used in conjunction with other types of vehicles. In general, embodiments may be used with desirable results in conjunction with any vehicle towing a trailer or carrying cargo over long distances.

Figure 2A:
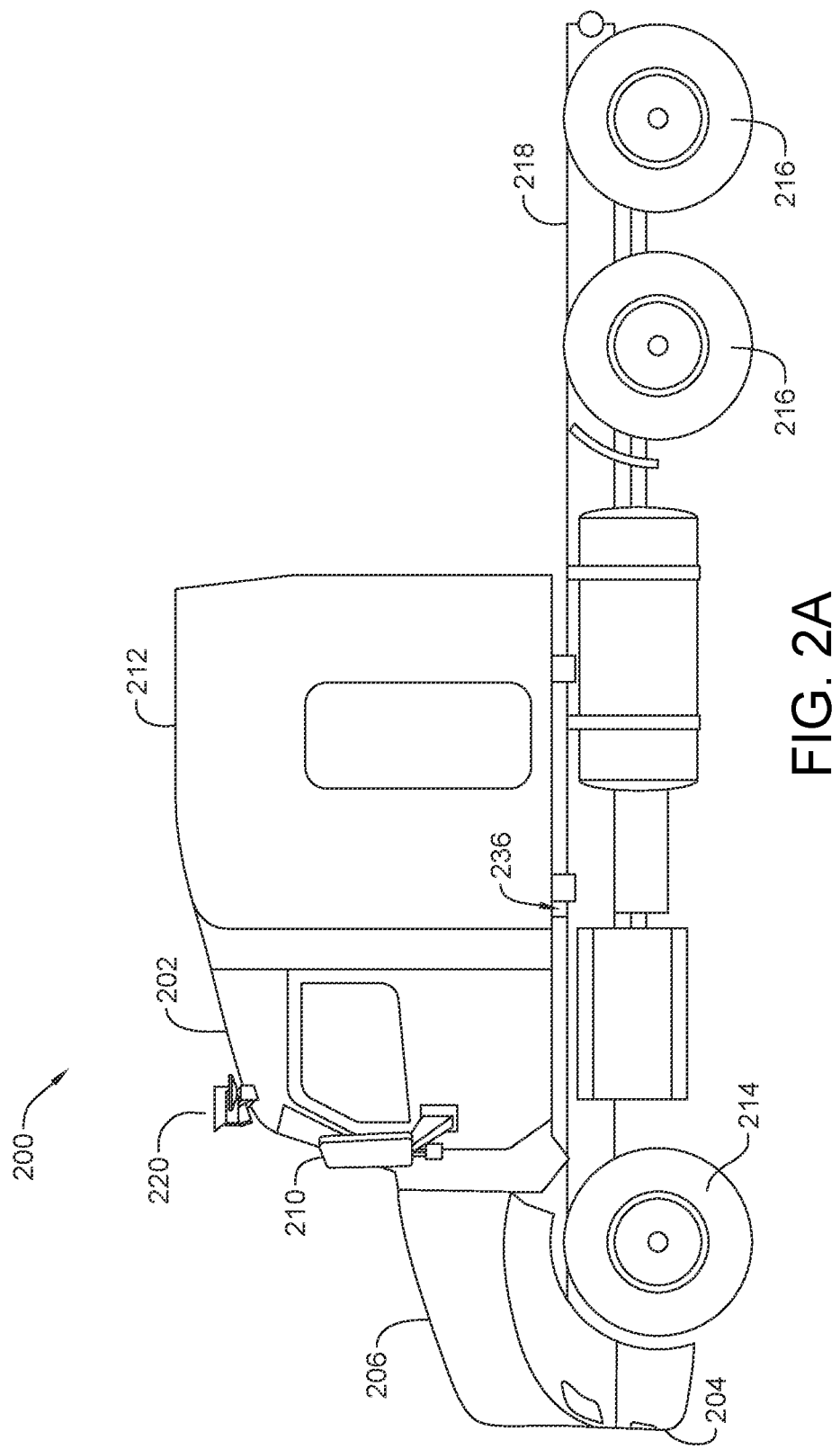
FIGS. 2A-2C are illustrative depictions of exterior views of a semi-truck, in accordance with example embodiments.
Figure 2B:
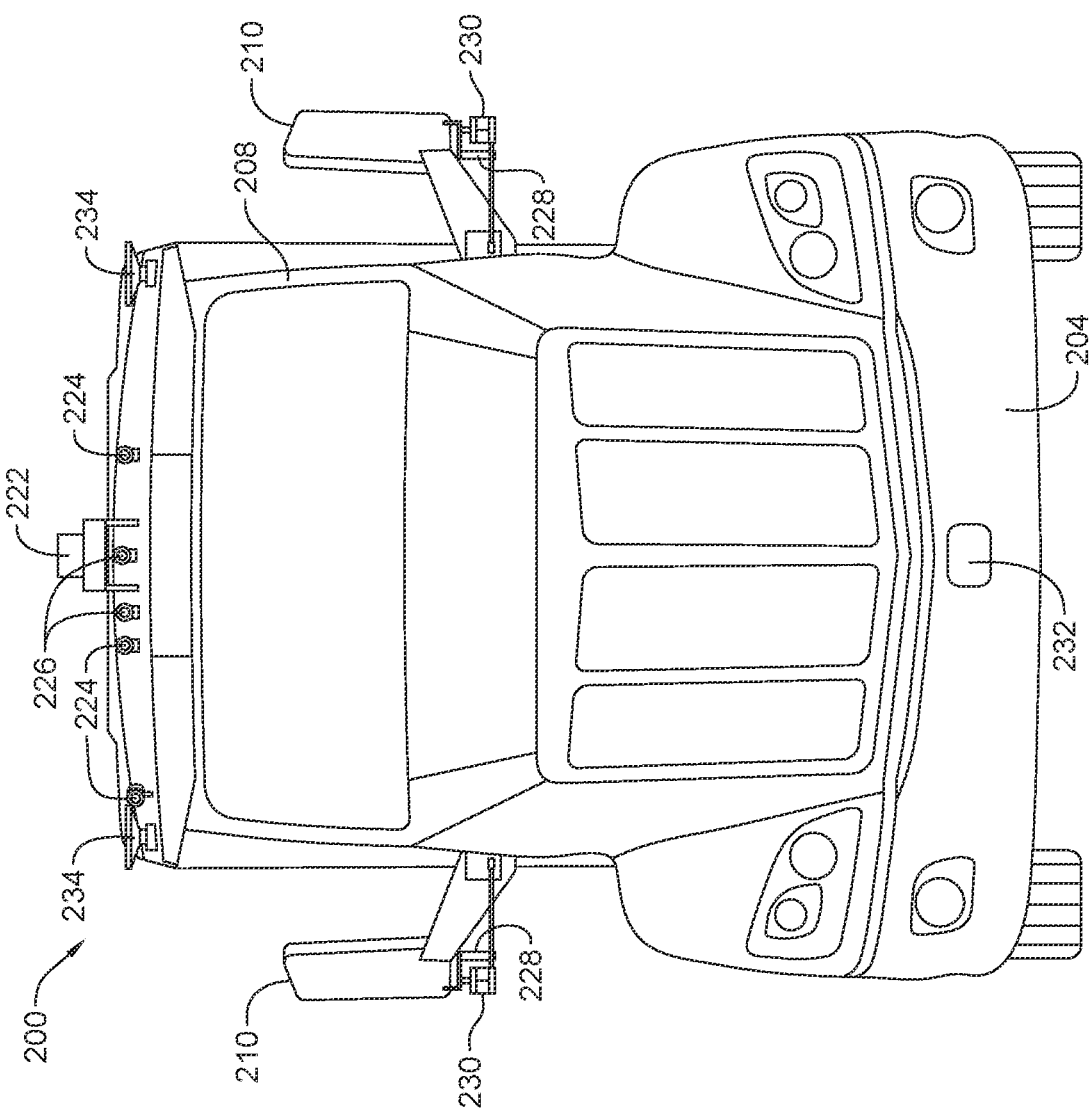
Figure 2C:
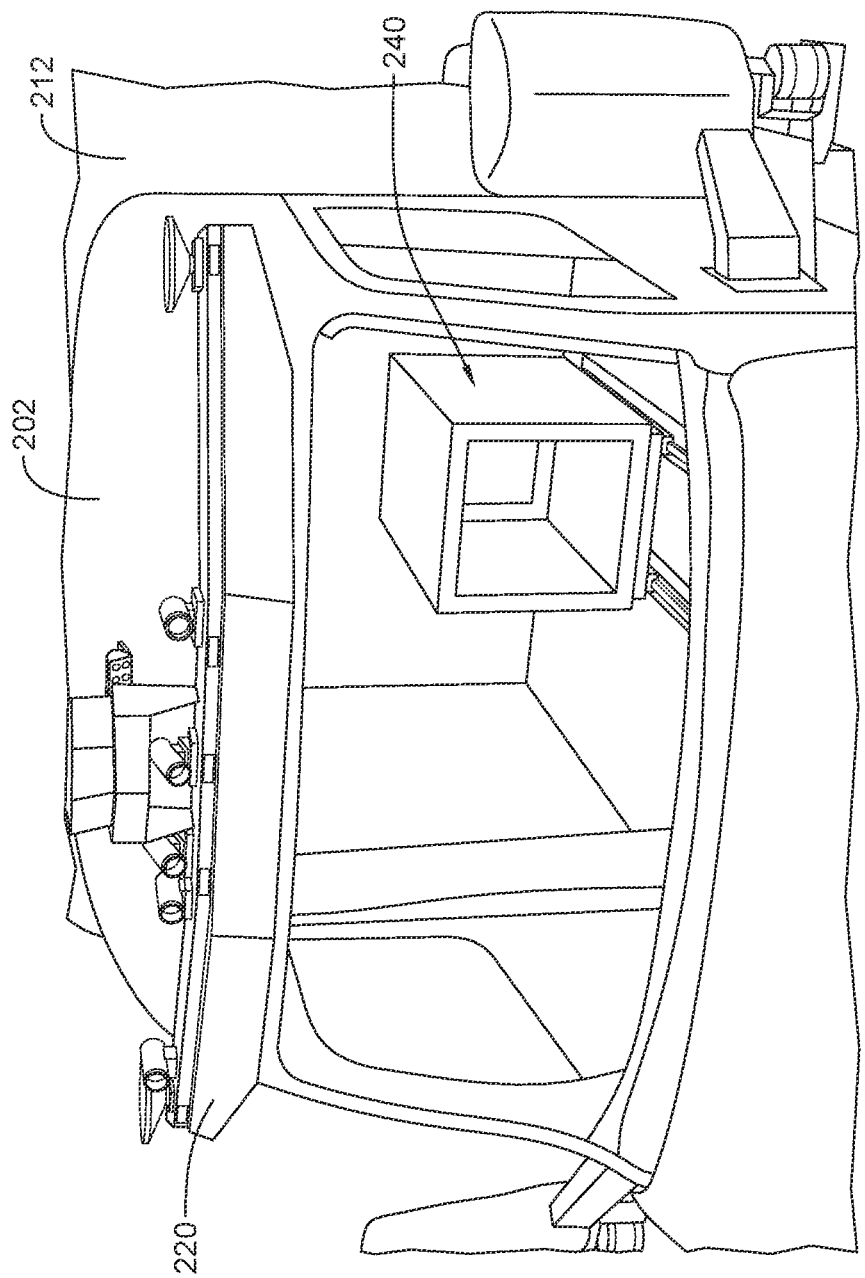

FIG. 1 illustrates a control system 100 that may be deployed in and comprise an autonomous vehicle (AV) such as, for example though not limited to, a semi-truck 200 depicted in FIGS. 2A-2C, in accordance with an example embodiment. Referring to FIG. 1, the control system 100 may include sensors 110 that collect data and information provided to a computer system 140 to perform operations including, for example, control operations that control components of the vehicle via a gateway 180. Pursuant to some embodiments, gateway 180 is configured to allow the computer system 140 to control different components from different manufacturers.

Computer system 140 may be configured with one or more central processing units (CPUs) 142 to perform processing, including processing to implement features of embodiments of the present invention as described elsewhere herein, as well as to receive sensor data from sensors 110 for use in generating control signals to control one or more actuators or other controllers associated with systems of the vehicle in which control system 100 is deployed (e.g., actuators or controllers allowing control of a throttle 184, steering systems 186, brakes 188 and/or other devices and systems). In general, control system 100 may be configured to operate the vehicle (e.g., semi-truck 200) in an autonomous (or semi-autonomous) mode of operation.

For example, control system 100 may be operated to capture images from one or more cameras 112 mounted at various locations of semi-truck 200 and perform processing (e.g., image processing) on those captured images to identify objects proximate to or in a path of the semi-truck 200. In some aspects, one or more lidars 114 and radar 116 sensors may be positioned on the vehicle to sense or detect the presence and volume of objects proximate to or in the path of the semi-truck 200. Other sensors may also be positioned or mounted at various locations of the semi-truck 200 to capture other information such as position data. For example, the sensors might include one or more satellite positioning sensors and/or inertial navigation systems such as GNSS/IMU 118. A Global Navigation Satellite System (GNSS) is a space-based system of satellites that provides the location information (longitude, latitude, altitude) and time information in all weather conditions, anywhere on or near the Earth to devices called GNSS receivers. GPS is the world's most used GNSS system and may be used interchangeably with GNSS herein. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention.

The data collected by each of the sensors 110 may be processed by computer system 140 to generate control signals that might be used to control an operation of the semi-truck 200. For example, images and location information may be processed to identify or detect objects around or in the path of the semi-truck 200 and control signals may be transmitted to adjust throttle 184, steering 186, and/or brakes 188 via controller(s) 182, as needed to safely operate the semi-truck 200 in an autonomous or semi-autonomous manner. Note that while illustrative example sensors, actuators, and other vehicle systems and devices are shown in FIG. 1, those skilled in the art, upon reading the present disclosure, will appreciate that other sensors, actuators, and systems may also be included in system 100 consistent with the present disclosure. For example, in some embodiments, actuators that provide a mechanism to allow control of a transmission of a vehicle (e.g., semi-truck 200) may also be provided.

Control system 100 may include a computer system 140 (e.g., a computer server) that is configured to provide a computing environment in which one or more software, firmware, and control applications (e.g., items 160-182) may be executed to perform at least some of the processing described herein. In some embodiments, computer system 140 includes components that are deployed on a vehicle (e.g., deployed in a systems rack 240 positioned within a sleeper compartment 212 of the semi-truck as shown in FIG. 2C). Computer system 140 may be in communication with other computer systems (not shown) that might be local to and/or remote from the semi-truck 200 (e.g., computer system 140 might communicate with one or more remote terrestrial or cloud-based computer system via a wireless communication network connection).

According to various embodiments described herein, computer system 140 may be implemented as a server. In some embodiments, computer system 140 may be configured using any of a number of computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

Different software applications or components might be executed by computer system 140 and control system 100. For example, as shown at active learning component 160, applications may be provided that perform active learning machine processing to process images captured by one or more cameras 112 and information obtained by lidars 114. For example, image data may be processed using deep learning segmentation models 162 to identify objects of interest in the captured images (e.g., other vehicles, construction signs, etc.). In some aspects herein, deep learning segmentation may be used to identify lane points within the lidar scan. As an example, the system may use an intensity-based voxel filter to identify lane points within the lidar scan. Lidar data may be processed by machine learning applications 164 to draw or identify bounding boxes on image data to identify objects of interest located by the lidar sensors.

Information output from the machine learning applications may be provided as inputs to object fusion 168 and vision map fusion 170 software components that may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). In some aspects, these applications allow control system 100 to be less map reliant and more capable of handling a constantly changing road environment. Further, by correcting any map errors on-the-fly, control system 100 may facilitate safer, more scalable and more efficient operations as compared to alternative map-centric approaches.

Information is provided to prediction and planning application 172 that provides input to trajectory planning 174 components allowing a trajectory to be generated by trajectory generation system 176 in real time based on interactions and predicted interactions between the semi-truck 200 and other relevant vehicles in the trucks operating environment. In some embodiments, for example, control system 100 generates a sixty second planning horizon, analyzing relevant actors and available trajectories. The plan that best fits multiple criteria (including safety, comfort and route preferences) may be selected and any relevant control inputs needed to implement the plan are provided to controller(s) 182 to control the movement of the semi-truck 200.

In some embodiments, these disclosed applications or components (as well as other components or flows described herein) may be implemented in hardware, in a computer program executed by a processor, in firmware, or in a combination of the above, unless otherwise specified. In some instances, a computer program may be embodied on a computer readable medium, such as a storage medium or storage device. For example, a computer program, code, or instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

A non-transitory storage medium may be coupled to a processor such that the processor may read information from, and write information to, the storage medium. In an alternative, the storage medium may be integral to the processor. The processor and the storage medium may reside in an application specific integrated circuit ("ASIC"). In an alternative embodiment, the processor and the storage medium may reside as discrete components. For example, FIG. 1 illustrates an example computer system 140 that may represent or be integrated in any of the components disclosed hereinbelow, etc. As such, FIG. 1 is not intended to suggest any limitation as to the scope of use or functionality of embodiments of a system and method disclosed herein. Computer system 140 is capable of being implemented and/or performing any of the functionality disclosed herein.

Computer system 140 may be described in the general context of computer system-executable instructions, such as program modules, being executed by a computer system. Generally, program modules may include routines, programs, objects, components, logic, data structures, and so on that perform particular tasks or implement particular abstract data types. Computer system 140 may be implemented in distributed cloud computing environments where tasks are performed by remote processing devices that are linked through a communications network. In a distributed cloud computing environment, program modules may be located in both local and remote computer system storage media including non-transitory memory storage devices.

Referring to FIG. 1, computer system 140 is shown in the form of a general-purpose computing device. The components of the computer system 140 may include, but are not limited to, one or more processors (e.g., CPUs 142 and GPUs 144), a communication interface 146, one or more input/output interfaces 148, and one or more storage devices 150. Although not shown, computer system 140 may also include a system bus that couples various system components, including system memory, to CPUs 142. In some embodiments, input/output (I/O) interfaces 148 may also include a network interface. For example, in some embodiments, some or all of the components of the control system 100 may be in communication via a controller area network ("CAN") bus or the like interconnecting the various components inside of the vehicle in which control system 100 is deployed and associated with.

In some embodiments, storage device 150 may include a variety of types and forms of non-transitory computer readable media. Such media may be any available media that is accessible by computer system/server, and it may include both volatile and non-volatile media, removable and non-removable media. System memory, in one embodiment, implements the processes represented by the flow diagram (s) of the other figures herein. The system memory can include computer system readable media in the form of volatile memory, such as random access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules, code, and/or instructions that are configured to carry out the functions of various embodiments of the application.

In some embodiments, one or more aspects, features, devices, components, and systems of computer system 140 may be accessed, provided by, or supported by cloud services made available through the internet. In some instances, the cloud services might include infrastructure, platforms, or software hosted by a third-party provider (e.g., Amazon Web Services, Microsoft Azure, Google Cloud Platform, etc.). For example, in some embodiments, at least some portion of one or more of the storage, processing, and control functions or components of computer system 140 may be provided by cloud services accessed via the internet. In some aspects, the cloud services might be implemented as Infrastructure-as-a-Service (IaaS), Platforms-as-a-Service (PaaS), Software-as-a-Service (SaaS), Function-as-a-Service (FaaS), and other cloud computing service solutions.

FIGS. 2A-2C are illustrative depictions of exterior views of a semi-truck 200 that may be associated with or used in accordance with example embodiments. Semi-truck 200 is shown for illustrative purposes only. As such, those skilled in the art, upon reading the present disclosure, will appreciate that embodiments may be used in conjunction with a number of different types of vehicles and are not limited to a vehicle of the type illustrated in FIGS. 2A-2C. The example semi-truck 200 shown in FIGS. 2A-2C is one style of truck configuration that is common in North America that includes an engine 206 forward of a cab 202, a steering axle 214, and two drive axles 216. A trailer (not shown) may typically be attached to semi-truck 200 via a fifth-wheel trailer coupling that is provided on a frame 218 and positioned over drive axles 216. A sleeper compartment 212 may be positioned behind cab 202, as shown in 2A and 2C. FIGS. 2A-2C further illustrate a number of sensors that are positioned at different locations of semi-truck 200. For example, one or more sensors may be mounted on a roof of cab 202 on a sensor rack 220. Sensors may also be mounted on side mirrors 210, as well as other locations of the semi-truck. Sensors may be mounted on a bumper 204, as well as on the side of the cab 202 and other locations. For example, a rear facing radar 236 is shown as being mounted on a side of the cab 202 in FIG. 2A. Embodiments may be used with other configurations of trucks and other vehicles (e.g., such as semi-trucks having a cab over or cab forward configuration or the like). In general, and without limiting embodiments of the present disclosure, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors above windshield 208 including a long range lidar 222, long range cameras 224, GPS antennas 234, and mid-range front facing cameras 226. Side mirrors 210 may provide mounting locations for rear-facing cameras 228 and mid-range lidar 230. A front radar 232 may be mounted on bumper 204. Other sensors (including those shown and some not shown) may be mounted or installed on other locations of semi-truck 200. As such, the locations and mounts depicted in FIGS. 2A-2C are for illustrative purposes only.

Referring now to FIG. 2C, a partial view of semi-truck 200 is shown that depicts some aspects of an interior of cab 202 and the sleeper compartment 212. In some embodiments, portion(s) of control system 100 of FIG. 1 might be deployed in a systems rack 240 in the sleeper compartment 212, allowing easy access to components of the control system 100 for maintenance and operation.

Particular aspects of the present disclosure relate to a method and system providing a framework for generating a three-dimensional (3D) road geometry estimate. In some aspects, the generated 3D road geometry is sufficiently accurate for use cases and applications related to an autonomous vehicle, in real-time as an autonomous vehicle, AV, (e.g., a truck similar to that disclosed in FIGS. 1 and 2A-2C) is being operated (e.g., driven). Aspects of the present disclosure provide, in general, a framework to estimate the stationary world around the AV accurately and efficiently, including, for example, lane-lines, barriers, drivable surfaces, road edges, signs, etc.

Figure 3:
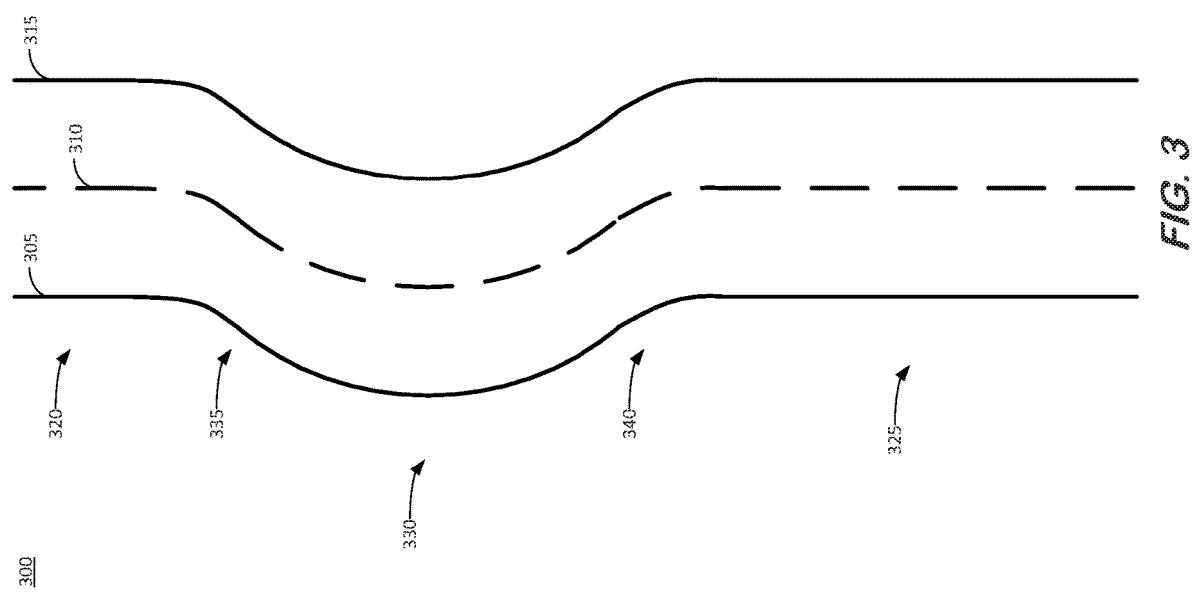
FIG. 3 is an illustrative depiction of a road on which an autonomous vehicle may operate, in accordance with an example embodiment.

FIG. 3 is an illustrative depiction of a road 300 on which an autonomous vehicle may operate, in accordance with an example embodiment. Road 300 is a simplified depiction of a road, defined by lane lines 305, 310, and 315. As described herein, roads can be modeled as having a curvature that is either constant or changing linearly. As used herein, roads can be modeled as a "straight" road having zero curvature, a "curve" having a constant non-zero curvature, and a "transition" between a straight and a curve having a curvature that changes linearly. As an example, a vehicle driving along a straight segment of road (e.g., 320, 325) may correspond to controlling the vehicle's steering wheel at (approximately) zero degrees (i.e., not turning either left or right of the current path of travel). A vehicle driving along curve segment of road (e.g., 330) may correspond to controlling (i.e., steering) the vehicle's steering wheel at (approximately) some non-zero angle. A transition segment of road (e.g., 335, 340) having a curvature that changes linearly may be exemplified by a vehicle driving along a segment of road requiring controlling the steering wheel to turn at (approximately) a constant rate.

Regarding a road modeled as having a curvature that is either constant or changing linearly, consider a segment of road, and let s [m] denote the arc length, i.e., the distance (i.e., position) along the road segment. The curvature of the road segment can be expressed as:

$$K(S) = K_0 + K_1 S \tag{1}$$

where $k_0$ is the initial curvature of the segment, and $k_1$ is the curvature change rate. That is, we describe the road curvature as a function of the initial curvature and a curvature rate as we move along the road. The shape formed by a linearly changing curvature is also called Clothoid, or Euler spiral. Note that the curvature model (1) fits all three cases of roads introduced above including:

Straight road: $K_0 = K_1 = 0$

Curve: $K_0 \neq 0, K_1 = 0$

Transition: $K_0 \in \mathbb{R}, K_1 \neq 0$

A heading or orientation of the road segment herein may be expressed as:

$$\varphi(s) = \varphi_0 + \kappa_0 s + \frac{\kappa_1}{2} s^2 \tag{2}$$

where $\varphi_0$ is the initial heading. As seen, the heading may be expressed based on a similar or same principle as the curvature. For example, when an AV is on the road in a lane, the AV is facing some direction or heading. As the AV drives along the road, this heading might change depending on whether the road is straight or whether it is curving. Road heading equation (2) describes how the road orientation or the road heading changes. As shown, there is an initial orientation and equation (2) shows the mathematical representation for heading at a location s.

In some aspects, we want a model to describe the Cartesian road position (x,y) as a function of the heading. That is, we want to describe the road geometry. In some embodiments, a road geometry model is presented in the two equations 3(a) and 3(b). However, the two equations 3(a) and 3(b) do not have an analytical solution.

The 2D Cartesian road geometry of the road segment is described as:

$$x(s) = x_0 + \int_0^s \cos(\varphi(t))dt \tag{3a}$$

$$y(s) = y_0 + \int_0^s \cos(\varphi(t))dt \tag{3b}$$

where $(x_0, y_0)$ is the position where the road segments begin. The parameters of a road segment are given by the vector including the parameters for curvature rate, initial curvature, and 2D position, $$0 = [K_1 K_0 \varphi_0 x_0 y_0]^T \tag{4}$$

In the present disclosure, unless otherwise noted, standard units for the different variables include for x/y/z position—[m], road heading—[radians], curvature—[1/m], curvature rate [1/m²], road grade—[unit-less], and road grade rate—[1/m].

The integrals in (3) do not have a closed form solution and in the context of road geometry estimation, they are commonly approximated (e.g., using polynomials of order 2 or 3, or using Taylor expansion, resulting in a polynomial of some order). These common approximations include errors that are not suitable for use in AV control and guidance operations.

Using the angle addition formulae for sine and cosine, and the fact that the initial orientation $\varphi_0$ is independent of the integrand t, the integral equations (3) can be written as, $$x(s) = \begin{bmatrix} x(s) \\ y(s) \end{bmatrix} = \begin{bmatrix} x_0 \\ y_0 \end{bmatrix} + R(\varphi_0) \begin{bmatrix} \int_0^s \cos\left(\kappa_0 t + \frac{\kappa_1}{2} t^2\right)dt \\ \int_0^s \cos\left(\kappa_0 t + \frac{\kappa_1}{2} t^2\right)dt \end{bmatrix} \tag{5}$$

with rotation matrix $$R(\theta) = \begin{bmatrix} \cos(\theta) & -\sin(\theta) \\ \sin(\theta) & \cos(\theta) \end{bmatrix} \quad (6)$$

Expressed another way, we have a rigid-body transformation of the vector $$\begin{bmatrix} \int_0^s \cos\left(\kappa_0 t + \frac{\kappa_\lambda}{2} t^2\right) dt \\ \int_0^s \cos\left(\kappa_0 t + \frac{\kappa_\lambda}{2} t^2\right) dt \end{bmatrix} \quad (7)$$

with a rotation of $\varphi_0$ radians and a translation vector $[x^0 y^0]^T$. By reformulating the road geometry equation (3) this way, we can focus on the integrals (7).

In some aspects, the integrals in (3) and in (7) are similar to Fresnel integrals, defined either as:

$$S^1(s) = \int_0^s \sin\left(\frac{\pi t^2}{2}\right) dt \quad (8a)$$

$$C^1(s) = \int_0^s \cos\left(\frac{\pi t^2}{2}\right) dt \quad (8b)$$

or as $$S^2(s) = \int_0^s \sin\left(\frac{t^2}{2}\right) dt \quad (9a)$$

$$C^2(s) = \int_0^s \cos\left(\frac{t^2}{2}\right) dt \quad (9b)$$

The Fresnel integrals have accurate approximations based on power series expansion. The integral approximations are available in, e.g., SciPy (e.g., approximations of Fresnel integrals provided by SciPy). Thus, by rewriting (7) and expressing the integrals in terms of Fresnel integrals, we can utilize the accurate approximations of (8) in order to solve the road geometry estimation problem of (3). A road geometry represented by equations (8) can be used to compute a road geometry with smaller approximations that are compatible with and useful in AV control, navigation, calibration, and guidance.

As shown further below, the solution to the road geometry problem can be expressed as:

$$x(s) = \begin{bmatrix} x(s) \\ y(s) \end{bmatrix} = \begin{bmatrix} x_0 \\ y_0 \end{bmatrix} + R(\Psi(\varphi_0, \kappa_0, \kappa_1)) \begin{bmatrix} C(s, \kappa_0, \kappa_1) \\ S(s, \kappa_0, \kappa_1) \end{bmatrix} \quad (10)$$

for some functions $\psi(\cdot), C(\cdot),$ and $S(\cdot)$

Expressions for the road geometry will now be disclosed using Fresnel integrals. Expressions for the road geometry are now provided for the case $k_1=0$, and then $k_1 \neq 0$. In the case the curvature rate $k_1=0$, then the integrals (7) have closed form solutions. It can be shown that the 2D Cartesian road geometry (3) becomes $$x(s) = \begin{bmatrix} x(s) \\ y(s) \end{bmatrix} = \begin{bmatrix} x_0 \\ y_0 \end{bmatrix} + R(\varphi_0) \begin{bmatrix} s \operatorname{sinc}(\kappa_0 s) \\ s \operatorname{cosc}(\kappa_0 s) \end{bmatrix} \quad (11)$$

where the functions $\operatorname{sinc}(\cdot)$ and $\operatorname{cosc}(\cdot)$ are defined as $$\operatorname{sinc}(x) = \begin{cases} \dfrac{\sin(x)}{x} & x \neq 0 \\ 1 & x = 0 \end{cases} \quad (12)$$

$$\operatorname{cosc}(x) = \begin{cases} \dfrac{1 - \cos(x)}{x} & x \neq 0 \\ 0 & x = 0 \end{cases} \quad (13)$$

In other words, we have $$\psi(\varphi_0, K_0, 0) = \varphi_0 \quad (14a)$$

$$C(s, K_0, 0) = s \operatorname{sinc}(K_0 s) \quad (14b)$$

$$S(s, K_0, 0) = s \operatorname{cosc}(K_0 s) \quad (14c)$$

In the instance of a non-zero curvature rate, $k_1 \neq 0$, three cases are considered: a positive rate $k_1 > 0$, a negative rate $k_1 < 0$, and very small rate $|k_1| \leq T_{k_1}$ for some threshold $T_{k_1}$.

In the case where the curvature rate is positive, $k_1 > 0$, then we get $$\psi(\varphi_0, \kappa_0, \kappa_1) = \varphi_0 - \frac{\kappa_0^2}{2\kappa_1} \quad (15a)$$

$$C(s, K_0, K_1) = f_C(s, K_0, K_1) \quad (15b)$$

$$S(s, K_0, K_1) = f_S(s, K_0, K_1) \quad (15c)$$

where $$f_C(s, \kappa_0, \kappa_1) = \sqrt{\frac{\pi}{\kappa_1}} \left( C^1\left(h^1(s, \kappa_0, \kappa_1)\right) - C^1\left(h^2(s, \kappa_0, \kappa_1)\right) \right) \quad (16a)$$

$$f_S(s, \kappa_0, \kappa_1) = \sqrt{\frac{\pi}{\kappa_1}} \left( S^1\left(h^1(s, \kappa_0, \kappa_1)\right) - S^1\left(h^2(s, \kappa_0, \kappa_1)\right) \right) \quad (16b)$$

$$h^1(s, \kappa_0, \kappa_1) = \sqrt{\frac{\kappa_1}{\pi} s + \frac{\kappa_0}{\sqrt{\pi \kappa_1}}} \quad (16c)$$

$$h^2(s, \kappa_0, \kappa_1) = \frac{\kappa_0}{\sqrt{\pi \kappa_1}} \quad (16d)$$

In the case where the curvature rate is negative, $k_1 < 0$, then we get $$\Psi(\varphi_0, \kappa_0, \kappa_1) = \varphi_0 - \frac{\kappa_0^2}{2\kappa_1} \quad (17a)$$

$$C(s, K_0, K_1) = fc(s, -K_0, -K_1)$$

$$S(s, K_0, K_1) = -fs(s, -N_0, -N_1)$$

Considering the case where the curvature rate is very small, note the divisions by $k_1$ in (15), (16), and (17) can lead to numerical problems if $k_1$ is very small. If the absolute curvature rate is smaller than some threshold, $|k_1| \leq T_{k_1}$, then we rely on Taylor expansion and use the following approximation, $$\psi(\varphi_0, K_0, K_1) = \varphi_0 \quad (18a)$$

$$C(s, K_0, K_1) \approx s\ \text{sinc}(K_0 s) = gc(s, K_0, K_1) \quad (18b)$$

$$S(s, K_0, K_1) \approx s\ \text{cosc}(K_0 s) = gs(s, K_0, K_1) \quad (18c)$$

where $$g_C(s, \kappa_0, \kappa_1) = \quad (19a)$$

$$\begin{cases} \frac{\kappa_1}{2\kappa_0^3}\left(\left((\kappa_0 s)^2 - 2\right)\cos(\kappa_0 s) - 2\kappa_0 s\ \sin(\kappa_0 s) + 2\right) & \text{if } |\kappa_0| > T_{\kappa_0} \\ -\frac{\kappa_0 \kappa_1 s^4}{8} & \text{if } |\kappa_0| > T_{\kappa_0} \end{cases}$$

$$g_S(s, \kappa_0, \kappa_1) = \quad (19b)$$

$$\begin{cases} \frac{\kappa_1}{2\kappa_0^3}\left(\left((\kappa_0 s)^2 - 2\right)\sin(\kappa_0 s) + 2\kappa_0 s\ \cos(\kappa_0 s) + 2\right) & \text{if } |\kappa_0| > T_{\kappa_0} \\ -\frac{\kappa_1 s^3}{2}\left(\frac{1}{3} - \frac{\kappa_0^2 s^2}{10}\right) & \text{if } |\kappa_0| > T_{\kappa_0} \end{cases}$$

For $|k_0| \leq T_{k_0}$, we use Taylor approximations to avoid numerical problems due to the division by $k_0$ in gC(•) and gS(•). Thus, it can be seen that as $k_1 \to 0$, (18b) and (18c) approaches (14b) and (14c), respectively.

Accordingly, in summary we note that, $$\Psi(\varphi_0, \kappa_0, \kappa_1) = \begin{cases} \varphi_0 & \text{if } |\kappa_1| < T_{\kappa_1} \\ \varphi_0 - \frac{\kappa_0^2}{2\kappa_1} & \text{if } |\kappa_1| \geq T_{\kappa_1} \end{cases} \quad (20a)$$

$$C(s, \kappa_0, \kappa_1) = \begin{cases} f_C(s, \kappa_0, \kappa_1) & \text{if } \kappa_1 > T_{\kappa_1} \\ f_C(s, -\kappa_0, -\kappa_1) & \text{if } \kappa_1 < -T_{\kappa_1} \\ s\ \text{sinc}(\kappa_0 s) + g_C(s, \kappa_0, \kappa_1) & \text{if } |\kappa_1| < T_{\kappa_1} \end{cases} \quad (20b)$$

$$S(s, \kappa_0, \kappa_1) = \begin{cases} f_S(s, \kappa_0, \kappa_1) & \text{if } \kappa_1 > T_{\kappa_1} \\ -f_S(s, -\kappa_0, -\kappa_1) & \text{if } \kappa_1 < -T_{\kappa_1} \\ s\ \text{cosc}(\kappa_0 s) + g_S(s, \kappa_0, \kappa_1) & \text{if } |\kappa_1| < T_{\kappa_1} \end{cases} \quad (20c)$$

As shown by the disclosure above, the (re)formulation of the expression for road geometry disclosed herein avoids the use of the significant approximations of prior models and mathematical expressions. In this manner, road geometry modeling using the road modelling techniques disclosed herein may be applicable to AV operating scenarios and use cases and include much smaller numerical errors as compared to other, previous models that are not accurate enough for AV operations.

Figure 4C:
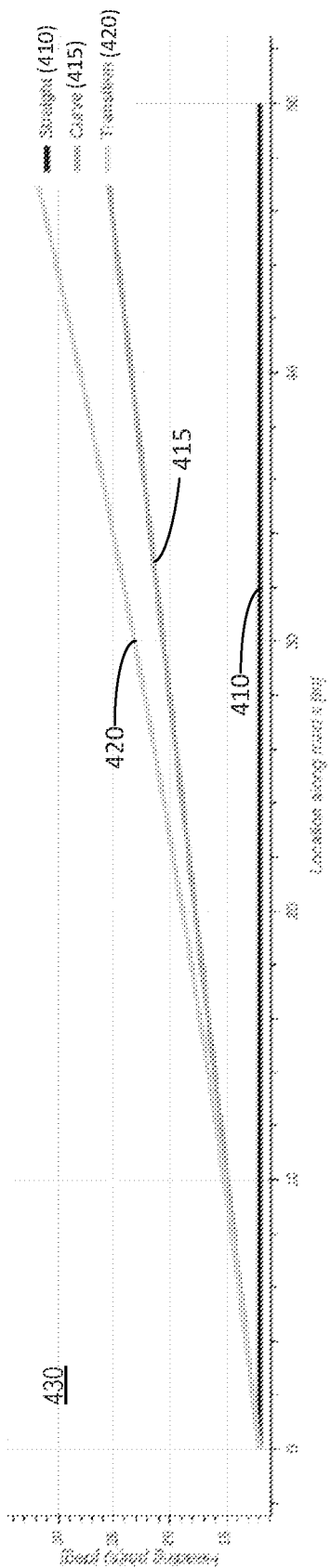
FIG. 4C is an illustrative plot of a heading for an example road, in accordance with an example embodiment.

FIGS. 4A-4C are illustrative plots of parameters (e.g., heading, curvature, and position) for example road segments, where the road segments include a straight segment, a curve segment, and a transition segment, in accordance with an example embodiment. In particular, FIG. 4A is an illustrative plot 405 of the y-component of a two-dimensional (2D) Cartesian position for the road segments, in accordance with an example embodiment. The y-position is shown for a straight segment of road 410, a curve segment 415, and a transition segment 420.

FIG. 4B is an illustrative plot 425 of a curvature for the road segments, in accordance with an example embodiment. In accordance with the definition of a road modelled on the basis of curvature herein, straight road segment 410 has zero curvature, curve road segment 415 has a constant non-zero curvature, and transition road segment 420 has a linearly changing curvature.

FIG. 4C is an illustrative plot 430 of a heading, or road orientation, for the illustrative road segments at various locations along the road, in accordance with an example embodiment. As shown the heading for the straight road segment 410 is constant, non-changing, whereas the heading changes along the road for the curve road segment 415 and the transition road segment 420.

Figure 5:
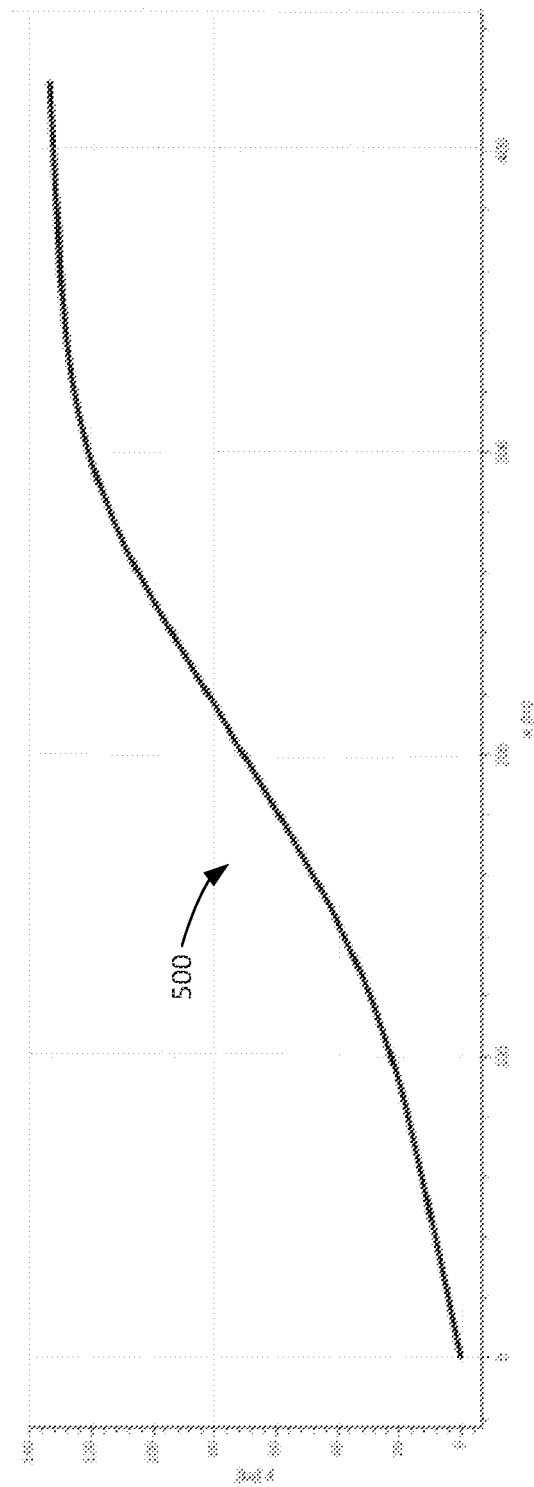
FIG. 5 is an illustrative representation of an example road on which an autonomous vehicle has travelled, in accordance with an example embodiment.

In some real-world scenarios, a longer segment of road might not be accurately modelled by a (singular) constant curvature rate. For example, if you consider a longer segment of road, e.g., a mile or two, the reality is that the road may not have the same curvature at all locations along the road. That is, the curvature rate may likely change at least once along the example longer road. For example, a road under consideration might include a straight road segment, at least one curve, and then it might change to a straight road segment again. FIG. 5 is an illustrative depiction of an example road 500 on which an autonomous vehicle may operate, in accordance with an example embodiment. As shown, road 500 does not have a same curvature over the entire length of the road.

Figure 6:
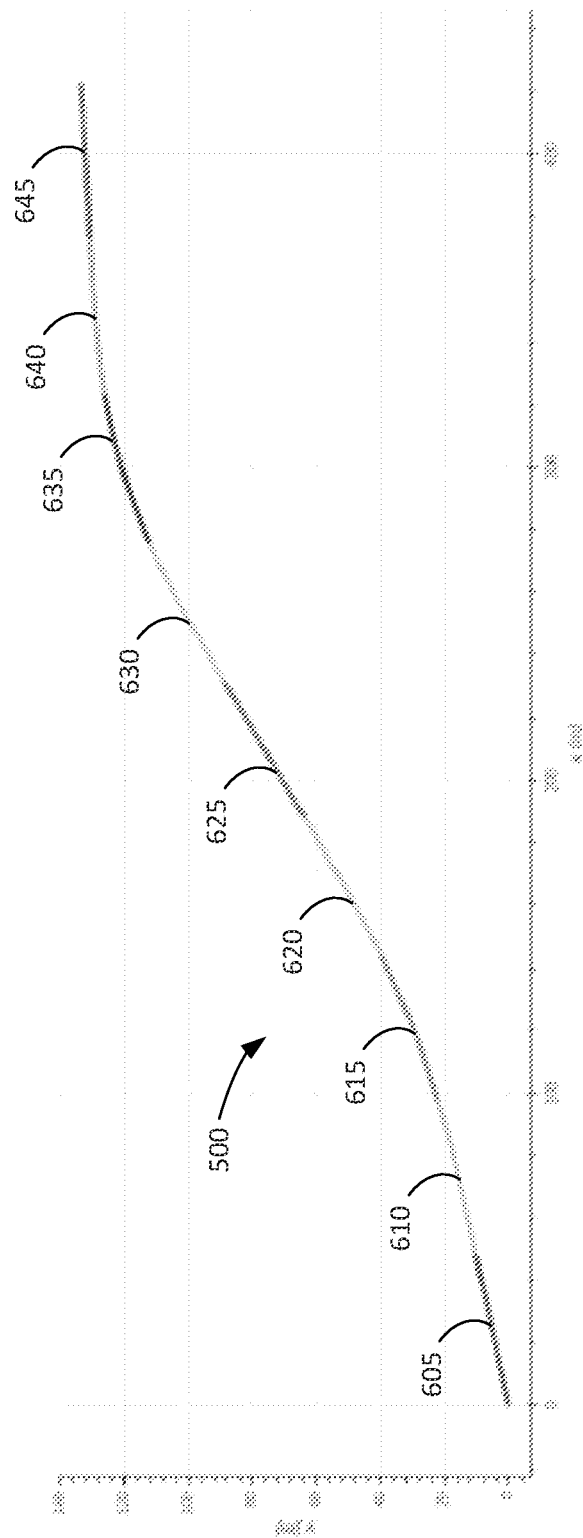
FIG. 6 is an illustrative depiction of the example road of FIG. 5 divided into a plurality of road segments, in accordance with an example embodiment.

In some embodiments herein, a road may be modeled as a plurality of road segments with changing curvature rates. That is, a road herein may be modelled as sequences of curvature models (e.g., straight road segments, curve road segments, and transition road segments). FIG. 6 is an illustrative depiction of the example road of FIG. 5 divided into a plurality of road segments, in accordance with an example embodiment. In FIG. 6, road 500 is shown as being divided into a consecutive sequence of nine(9) different road segments 605-645.

Figure 7A:
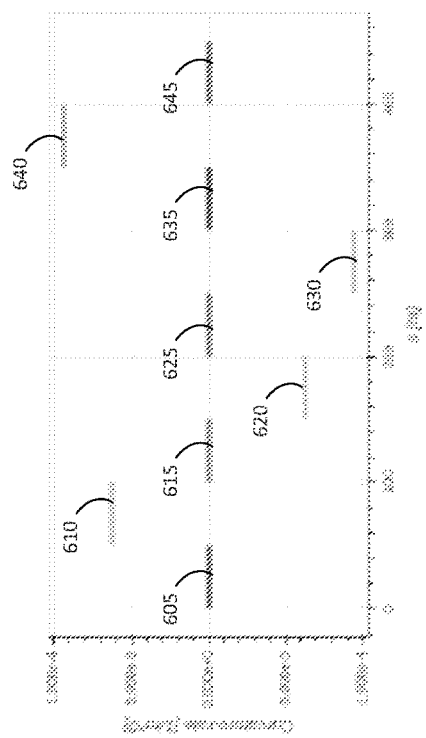
FIG. 7A is an illustrative plot of a curvature rate for the plurality of road segments of FIG. 6, in accordance with an example embodiment.

FIG. 7A is an illustrative plot of a curvature rate for the plurality of road segments of FIG. 6, in accordance with an example embodiment. As shown in FIG. 7A, road segments 605, 615, 625, 635, and 645 have a zero curvature rate corresponding to a straight road segment. Road segments 610, 620, 630, and 640 have a constant non-zero curvature rate corresponding to a curved road segment.

Figure 7B:
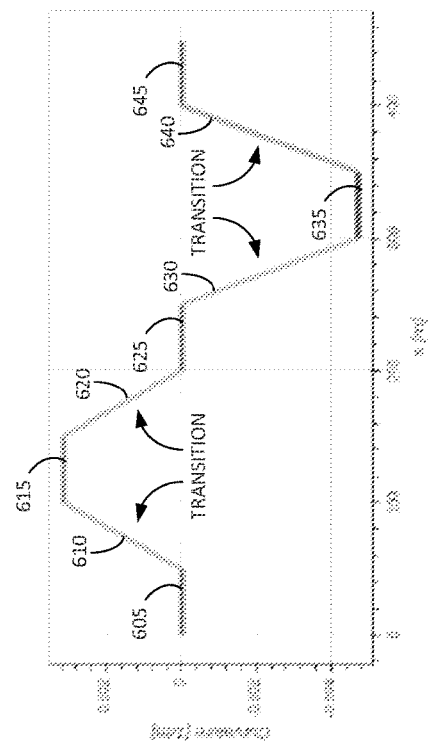
FIG. 7B is an illustrative plot of a curvature for the plurality of road segments of FIG. 6, in accordance with an example embodiment.

FIG. 7B is an illustrative plot of a curvature for the plurality of road segments 605-645 of FIG. 6, in accordance with an example embodiment. As shown in FIG. 7B, the curvature for the transition road segments 610, 620, 630, and 640 between the straight road segments (e.g., 605, 625, and 645 having a zero curvature) and the curve road segments (e.g., 615 and 635 having a constant non-zero curvature) is changing linearly.

The present disclosure includes modelling multiple road segments. Consider N consecutive road segments that follow the road geometry described by equation (3) and are of uniform length L. In order for the segments to align smoothly, they should be connected such that the complete road has G2-continuity (i.e., $2^{nd}$ order geometric). That is, at each junction between two consecutive road segments, the first and second derivatives all agree.

Given the reality of roads generally being continuous and generally smooth (i.e., without abrupt kinks in the road at transitions between different rates of curvature) in order to produce a smooth driving experience, a road geometry model should represent the same. Accordingly, at any point where two road segments join or meet, some embodiments herein have the constraint that the adjoining road segments have equal curvature, equal heading, and equal position to ensure that the underlying method and model that represents the real road is smooth. That is, in some embodiments the end point and the start point of consecutive road segments follows the constraints where the curvature, heading, and position of the two consecutive road segments are equal to each other.

Figure 7C:
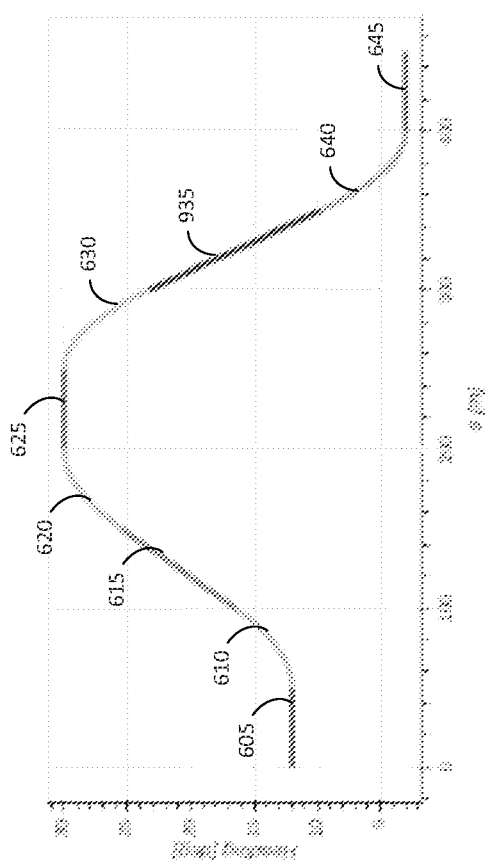
FIG. 7C is an illustrative plot of a heading along the plurality of road segments of FIG. 6, in accordance with an example embodiment.

FIG. 7C is an illustrative plot of a heading along the plurality of road segments 605-645 of FIG. 6, in accordance with the present example embodiment. FIG. 7C illustrates, in part, how the constraint for the headings between consecutive road segments (i.e., at the junction of consecutive road segments) being equal results in a "smooth" continuous road, as seen in FIG. 6.

G2-continuity may be ensured by the following constraints on the initial conditions on the road segments, $$K_0^i = K_0^{i-1} + L k_1^{i-1} \quad (21)$$

$$\varphi_0^i = \varphi_0^{i-1} + L\kappa_0^{i-1} + \frac{L^2}{2}\kappa_1^{i-1} \quad (22)$$

$$x_0^i = x^{i-1}(L) \quad (23)$$

$$y_0^i = y^{i-1}(L) \quad (24)$$

where $k_0^i$ is the initial curvature of segment number i, $k_1^i$ is the curvature rate of segment i, $\varphi_0^i$ is the initial road heading of segment i, $(x_0^i, y_0^i)$ is the initial 2D position of segment i, and $(x^i(L), y^i(L))$ is the final 2D position of segment i with length L.

Note that with N segments there are N+4 parameters that define the road, including the initial position $(x_0, y_0)$, the initial heading $\varphi_0$, the initial curvature $k_0$, and the N curvature rates $k_1^1, \ldots, k_1^N$. These parameters can be organized in a vector, $$\theta^{1:N} = [k_1^1 \ldots K_1^N K_0 \varphi_0 x_0 y_0]^T \quad (25)$$

The sequences of initial curvatures and headings can be computed recursively. However, if the parameters are organized in a vector (25), the initial curvatures and headings can be computed as matrix multiplications, $$K_1 = [K_1^1 \ldots K_1^N]^T = K_1 \theta^{1:N} \quad (26)$$

$$K_0 = [K_0^1 \ldots K_0^N]^T = K_0 \theta^{1:N} \quad (27)$$

$$\varphi_0 = [\varphi_0^1 \ldots \varphi_0^N]^T = \Phi_0 \theta^{1:N} \quad (28)$$

with the matrices $$K_1 = [I_N \ 0_{N\times 4}] \quad (29)$$

$$K_0 = \left[\begin{bmatrix} 0 & 0 & 0 & \ldots & 0 & 0 \\ L & 0 & 0 & \ldots & 0 & 0 \\ L & L & 0 & \ldots & 0 & 0 \\ \vdots & \vdots & \ddots & \vdots & \vdots & \vdots \\ L & L & \ldots & L & 0 & 0 \\ L & L & \ldots & L & L & 0 \end{bmatrix} 1_{N\times 1} \ 0_{N\times 1} \ 0_{N\times 2}\right] \quad (30)$$

$$\Phi_0 = \left[\begin{bmatrix} 0 & & & & & 0 \\ \frac{1}{2}L^2 & 0 & & & \ldots & 0 \\ \left(\frac{1}{2}+1\right)L^2 & \frac{1}{2}L^2 & 0 & & \ldots & 0 \\ \left(\frac{1}{2}+2\right)L^2 & \left(\frac{1}{2}+1\right)L^2 & \frac{1}{2}L^2 & 0 & \ldots & 0 \\ \vdots & & & & & \\ \left(\frac{1}{2}+N-2\right)L^2 & \left(\frac{1}{2}+N-3\right)L^2 & \ldots & \left(\frac{1}{2}+1\right)L^2 & \frac{1}{2}L^2 & 0 \end{bmatrix} \begin{bmatrix} 0 \\ L \\ 2L \\ 3L \\ \vdots \\ (N-1)L \end{bmatrix} 1_{N\times 1} \ 0_{N\times 2}\right] \quad (31)$$

where $I_m$ is an identity matrix of size m, $1_{m\times n}$ is an m×n all-one-matrix, and $0_{m\times n}$ is an m×n all-zero-matrix.

To get the initial curvature, or initial heading, of the ith segment, we multiply with the vector $e_N^i$, $$K_0^i = (e_N^i)^T K_0 \theta^{1:N} \quad (32)$$

$$\varphi_0^i = (e_N^i)^T \Phi_0 \theta^{1:N} \quad (33)$$

where $e_N^i$ is a N×1 matrix where all elements are zero except the ith element that is one.

To ensure equality of values between consecutive road segments, for the initial positions the ith segment's initial position is the final position of the previous segment i−1, and can be described as, $$x_0^i = \begin{bmatrix} x_0^i \\ y_0^i \end{bmatrix} = \begin{bmatrix} x^{i-1}(L) \\ y^{i-1}(L) \end{bmatrix} \quad (34)$$

$$= \begin{bmatrix} x_0^{i-1} \\ y_0^{i-1} \end{bmatrix} + R(\Psi(\varphi_0^{i-1}, \kappa_0^{i-1}, \kappa_1^{i-1})) \begin{bmatrix} C(L, \kappa_0^{i-1}, \kappa_1^{i-1}) \\ S(L, \kappa_0^{i-1}, \kappa_1^{i-1}) \end{bmatrix} \quad (35)$$

By applying this relation iteratively, we get, $$x_0^i = \begin{bmatrix} x_0^i \\ y_0^i \end{bmatrix} = \begin{bmatrix} x_0 \\ y_0 \end{bmatrix} + \sum_{i=1}^{i-1} R(\Psi(\varphi_0^i, \kappa_0^i, \kappa_1^i)) \begin{bmatrix} C(L, \kappa_0^i, \kappa_1^i) \\ S(L, \kappa_0^i, \kappa_1^i) \end{bmatrix} \quad (36)$$

For the multi-segment road geometry, let there be N segments of uniform length L. This implies that the location parameter $s \in [0, NL]$. Consider a location parameter s such that $(i-1)L \leq s < iL$, then the corresponding position on the road belongs to the ith segment and is defined as, $$x^{1:N}(s) = \begin{bmatrix} x(s) \\ y(s) \end{bmatrix} \quad (37a)$$

$$= \begin{bmatrix} x_0 \\ y_0 \end{bmatrix} + \sum_{j=1}^{i-1} R(\Psi(\varphi_0^{j-1}, \kappa_0^{j-1}, \kappa_1^{j-1})) \begin{bmatrix} C(L, \kappa_0^{j-1}, \kappa_1^{j-1}) \\ S(L, \kappa_0^{j-1}, \kappa_1^{j-1}) \end{bmatrix}$$

$$+ R(\Psi(\varphi_0^i, \kappa_0^i, \kappa_1^i)) \begin{bmatrix} C(s - L(i-1), \kappa_0^i, \kappa_1^i) \\ S(s - L(i-1), \kappa_0^i, \kappa_1^i) \end{bmatrix} \quad (37b)$$

$$= x_0 + \sum_{j=1}^{i-1} \Delta(L, \varphi_0^{j-1}, \kappa_0^{j-1}, \kappa_1^{j-1}) + \Delta(s - L(i-1), \varphi_0^i, \kappa_0^i, \kappa_1^i) \quad (37c)$$

where we introduce the notation, $$x_0(x_0, y_0) = \begin{bmatrix} x_0 \\ y_0 \end{bmatrix} \quad (38)$$

$$\Delta(s, \varphi_0^i, \kappa_0^i, \kappa_1^i) = R(\Psi(\varphi_0^i, \kappa_0^i, \kappa_1^i)) \begin{bmatrix} C(s, \kappa_0^i, \kappa_1^i) \\ S(s, \kappa_0^i, \kappa_1^i) \end{bmatrix} \quad (39)$$

for the sake of brevity.

The road geometry modeling above includes a 2D curvature modeling in a flat Cartesian plane (e.g., x, y). In some embodiments herein, the road geometry model is expanded to include a road altitude to provide a 3D road geometry model. The road geometry model uses a model for the road altitude or the road height that can be expressed in a manner similar to the curvature model above.

Consider a location on some segment of road, having an initial road altitude, $z_0[m]$, for the segment . There is an initial road grade, $v_0$, and a road grade rate, a, that describes a measure of the altitude change. The road grade may be expressed as, $v(s) = v_0 + as$ that describes the change in altitude (i.e., grade) for a travelled distance. The road grade, similar to curvature, is expressed as a function of the initial road grade $v_0$ plus the road grade rate times the distance travelled, as, where s is the location or the arc length. The road grade expression above can be used to determine how the road changes over a travelled distance (e.g., 1 meter). The road grade may be positive or negative. That is, the road grade may slope upwards, corresponding to a positive road grade, or slope downwards, corresponding to a negative road grade. If the road grade is zero, then the road is flat.

The road altitude may be expressed as, $$z(s) = z_0 + v_0 s + \frac{a}{2} s^2$$

that describes the road's altitude as a function of travelled distance, where s[m] denotes the arc length (i.e., the distance along the road segment). The road altitude is represented, in a manner similar to the road heading discussed above, by an initial road altitude, $z_0$, and a function of both the road grade ($v_0 s$) and the road grade rate, a.

Figure 8A:
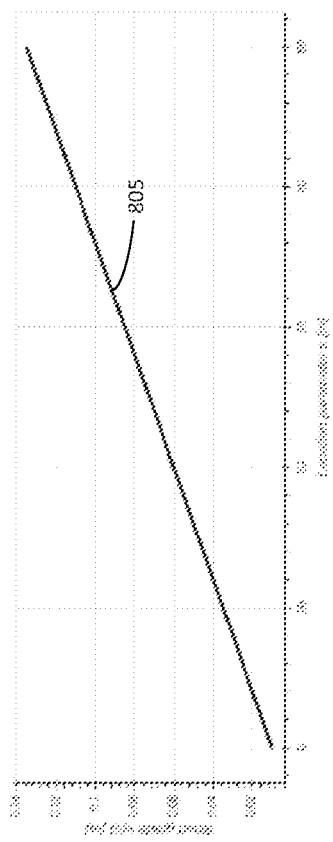
FIG. 8A is an illustrative plot of a road grade rate for an example road on which an autonomous vehicle has travelled, in accordance with an example embodiment.

FIG. 8A is an illustrative plot 805 of road grade for an example road on which an autonomous vehicle may operate, in accordance with an example embodiment. In the graph 805, the road grade is shown at various locations along the example road.

Figure 8B:
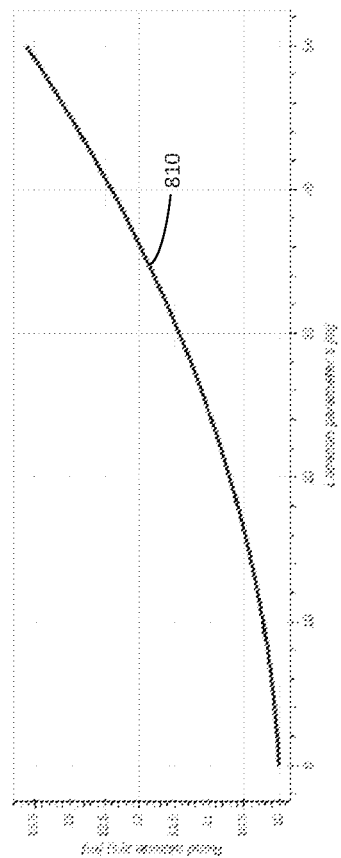
FIG. 8B is an illustrative plot of a road altitude for an example road on which an autonomous vehicle has travelled, in accordance with an example embodiment.

FIG. 8B is an illustrative plot 810 of a road altitude for an example road on which an autonomous vehicle may operate, in accordance with an example embodiment. In the graph 810, the road altitude is shown at various locations along the example road.

In some aspects, a 3D road altitude model provides a mechanism or framework to describe how a road altitude or height changes, for example an off-ramp of a highway may slope upwards towards an overpass that crosses over the highway. In this example, there is a positive road grade rate, where the road grade could be zero along an initial flat segment of the road and then the road grade rate changes to a positive road grade such that the combination of the two road segments is a road that starts sloping upwards.

In some embodiments, a road geometry model herein may be used to model a road by dividing or otherwise partitioning a road or representation thereof into a plurality of segments. In some instances, an implementation of the disclosed 3D road geometry estimation herein might divide a road into segments of equal length L (e.g., L=50 m). However, in some embodiments there is no requirement or necessity that the lengths of the road segments comprising a road be of equal length.

In some embodiments, an AV may be configured to determine or generate approximations of a road geometry based on the 3D road geometry disclosed herein. In some instances, each segment may be of equal length, whereas other implementations might vary the length of a road segment based on one or more factors (e.g., road terrain, computational resources, desired level of detail/granularity, etc., intended use or application of the calculated results, etc.).

As defined above, each road segment may be represented or described by a curvature rate and a road grade rate (i.e., two (2) parameters per segment) and an initial point including a 3D position (e.g., x, y, z), an initial heading, an initial curvature, and an initial road grade (i.e., six (6) parameters per initial point for each segment).

In some aspects, an embodiment of the 3D road geometry estimation disclosed herein provides a compact description of the road geometry with (relatively) few parameters, as compared to other, known road geometry models. As an example, if a road is divided into nine (9) segments, each segment may be described by two parameters, curvature rate and road grade rate, for 18 parameters (i.e., (9*2=18). The initial point for the road is specified by a 3D position of three (3) parameters (x, y, z) and the three (3) parameters of an initial heading, initial curvature, and initial road grade for an additional 6 parameters. Therefore, the road divided into nine (9) road segments may be represented, in total, by twenty-four (24) parameters. With a segment length of 50 meters, the 24 parameters represent a total length of 450 meters. With an alternative or previous representation, one might need many more parameters, e.g., a high definition polyline sampled every fifth meter would require 270 parameters. In this manner, the number of parameters required by the 3D road geometry modelling technique/process disclosed herein is far less than what is required by other previous road modeling techniques.

Figure 9:
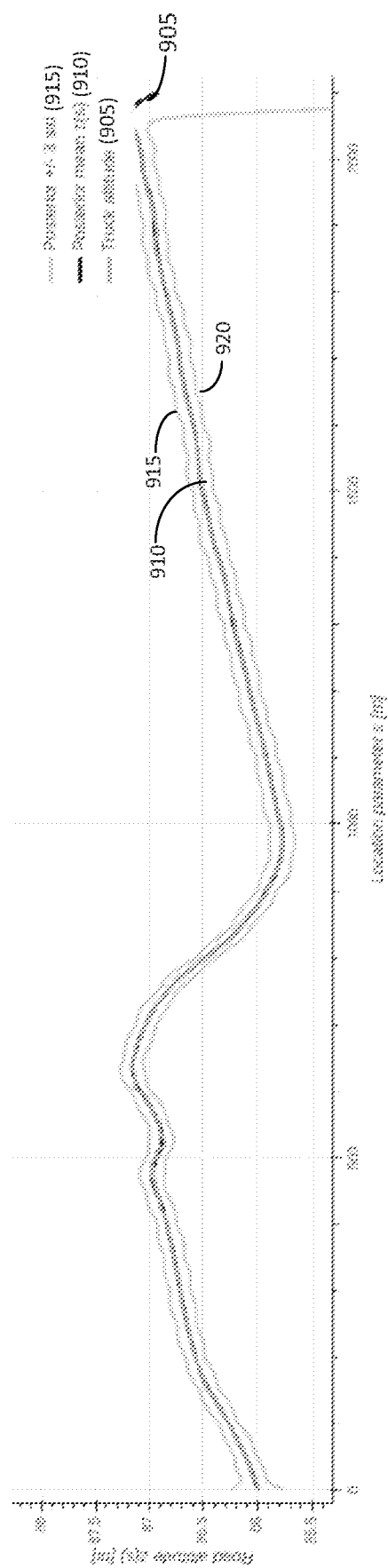
FIG. 9 is an illustrative plot related to a calculated 3D road geometry estimation, in accordance with an example embodiment.

At least some aspects of the 3D road geometry estimation(s) disclosed herein have been verified as being accurate and efficient based on, for example, GPS (Global Positioning System) measurements, lidar data, camera data, etc. of an AV configured to generate 3D road geometry using the model(s) disclosed herein, where sensor data from the vehicle (e.g., lidar data and radar data) were used as inputs to the model. As shown in FIG. 9, a calculated road altitude estimation 905 generated by the AV using the model(s) disclosed herein was determined to align with (i.e., fit) the GPS altitude data 910 within a desired posterior +/−3 standard deviation (915, 920).

Figure 10:
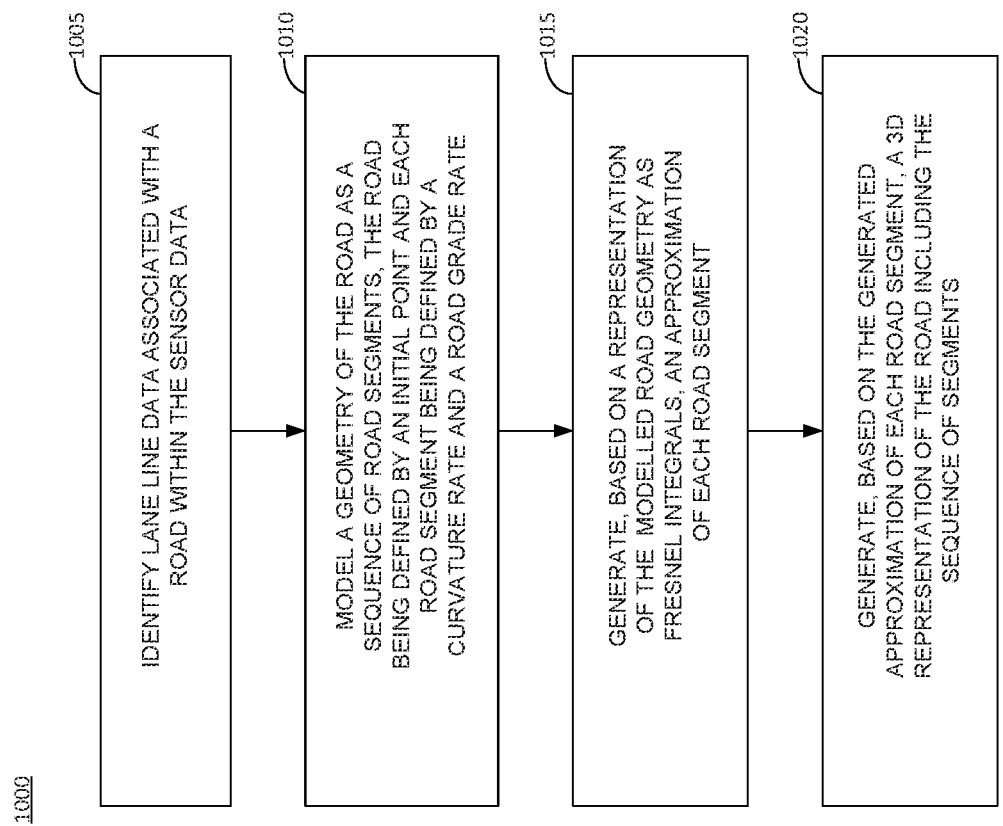
FIG. 10 is an illustrative flow diagram of a process, in accordance with an example embodiment.

FIG. 10 is an illustrative flow diagram of a process, in accordance with an example embodiment. In some embodiments, a system or apparatus disclosed herein might be used to implement some aspects of process 1000. At operation 1005, lane line data associated with a road within the sensor data of an AV is received. In some instances, the sensor data may be generated by one or more 3D lidars and one or more cameras disposed onboard the AV (e.g., cameras 112 and lidars 114 in FIG. 1). One or more processes may be executed by the AV (e.g., computer 140 in FIG. 1) to identify and determine the lane line data associated with a road based on the raw sensor data.

At operation 1010, a geometry of the road as a sequence of road segments is modeled, in accordance with the 3D road geometry modelling techniques and processes disclosed herein. In some embodiments, operation 1010 (or a separate operation, not shown) might include dividing the road under consideration into a plurality of road segments, where the sequence of the road segments might be maintained based on information (e.g., metadata, timestamps, etc.) associated with the data received at operation 1005. In accordance with other aspects disclosed herein, the road may be defined by an initial point specified by parameters including an initial road heading, an initial road curvature, and an initial location defined by a three-dimensional (3D) position (e.g., x, y, z coordinates), and each road segment may be defined by parameters including a curvature rate (e.g., $k_1$) and a road grade rate (e.g., a).

Continuing to operation 1015, an approximation of each road segment may be generated based on a representation of the modelled road geometry as Fresnel integrals. As disclosed hereinabove (e.g., equations 8(a), 8(b) or 9(a), 9(b)), the (re)formulation of the road geometry as Fresnel integrals provides a mechanism to provide an estimated road geometry with minimal approximation error(s).

At operation 1020, a 3D representation of the road including the sequence of segments is generated based on the generated approximation of each road segment. In accordance with other aspects disclosed herein, the 3D representation of the road may be generated by considering and adhering to one or more constraints, rules, or specifications for a 3D road geometry estimation. For example, operation 320 (or a separate operation, not shown) may consider constraints, rules, or specifications for a 3D road geometry estimation that specify that the junctions between consecutive road segments have equal curvature, equal heading, and equal position values for the adjacent road segments.

In some embodiments, the 3D road geometry modeling disclosed herein might be executed in real time on the vehicle (e.g., with the use of computer 140 or other systems and devices onboard the AV). The camera data, lidar data, and radar data generated on the truck may be processed by onboard computer(s) to generate accurate 3D representations of the road geometry using the modeling techniques disclosed herein.

In some aspects, as an AV is travelling on a road, it continuously sees more and more of the road moving from its initial starting location. While the AV might only see a limited stretch of road, it does acquire additional data to see more road as it moves along the road. In some embodiments, a 3D road geometry estimate implementation might extend and marginalize the extent of the road the AV generates. In some instances, the AV might generate a representation of the road in the immediate vicinity of the vehicle, some finite distance in front of the vehicle, and a finite distance backwards behind the truck (e.g., the distance represented behind the vehicle might be specified to be less than the extent of road generated in front of the vehicle, although it may be the same or even more). The extent of the road estimated ahead of and behind the vehicle might be specified to correspond to the capabilities of the sensors (e.g., lidar, radar, etc.) onboard the AV. That is, some embodiments might operate to continually (or at least periodically) add new road segments forward of the vehicle as it sees more of the road and also remove segments behind the vehicle as the vehicle travels forward since we might want to represent the road, primarily right where the vehicle is currently plus or minus some distance forward and some distance backwards.

In some aspects, one or more numerical optimization techniques and processes may be used in an implementation of the 3D road geometry modeling disclosed herein. In some instances, numerical optimization solvers might compute the Jacobians of the 3D road geometry model. The mathematical models disclosed herein might be expressed as Jacobians.

In some aspects, new measurements (i.e., sensor data) is received (e.g., from a camera, lidar, etc.), the updated measurements may be used to improve the current model so that the model is providing the most accurate and up to date curvature, road grade, and other determined parameter values. A number of different techniques and processes may be used to update the model based on updated sensor data, where such techniques and process are not limited to any one mathematical or other technical optimization or transformation. Such techniques and processes might provide a mechanism for an improved implementation that is more efficient and faster other implementation processes. The techniques and processes may each be based on the modelling equations (e.g., (8)) disclosed herein.

In some aspects, one important component to solving the road geometry estimation problem might be data association. For a lane line model such as disclosed herein, as new data is acquired by the vehicle, this newly acquired data may be used to improve the model. As such, data associations may need to be performed. For example, for an acquired camera image one needs to determine the specific pixels in the image that correspond to lane lines and which part of the lane line it measures. In some aspects, a data association may be viewed as a numerical optimization. In some embodiments, data associations herein may include dividing the data associations into three parts.

In some embodiments herein, data association for a single measurement can be divided into three parts:

1. associating the measurement to a multi-segment lane-line;
2. associating the measurement to one of the segments of the lane-line; and
3. associating the measurement to a location $\hat{s}$ along the segment.

Regarding associating data to a segment location, the following discloses a general methodology, but for a specific type of measurement (i.e., a 2D Cartesian measurement). Accordingly, the disclosed methodology may also be applied to other types of measurements including, for example, 3D Cartesian detections, camera pixel detections, etc. For associating data to a line segment, assume that the measurement $z=[z_x, z_y]^T$ has been associated to a road segment. For the sake of brevity, we skip the indexing of the road segment below.

The location $\hat{s}$, or arc length, along the segment that this measurement corresponds to is found by solving a minimization problem, $$\hat{s} = \underset{s}{\mathrm{argmin}}\ f(s) = \underset{s}{\mathrm{argmin}} \frac{1}{2} \left\| z - \begin{bmatrix} x(s) \\ y(s) \end{bmatrix} \right\|_2^2$$

$$= \underset{s}{\mathrm{argmin}} \frac{1}{2}\left((z_x - x(s))^2 + (z_y - y(s))^2\right)$$

where $\|\cdot\|_2$ denotes Euclidean norm. This minimization problem can be solved using a root-finding algorithm (e.g., Newton's method or Halley's method), which all require differentiation of the cost-function $f(s)$ with respect to the location s. It follows from the Fundamental theorem of calculus that, $$\frac{dx(s)}{ds} = \cos(\varphi(s))$$

$$\frac{dy(s)}{ds} = \sin(\varphi(s))$$

The first, second, and third derivatives of the cost-function are, $$f'(s) = \frac{df(s)}{ds} = -(z_x - x(s))\cos(\varphi(s)) - (z_y - y(s))\sin(\varphi(s))$$

$$f''(s) = \frac{d^2 f(s)}{ds^2} = 1 + \varphi'(s)((z_x - x(s))\sin(\varphi(s)) - (z_y - y(s))\cos(\varphi(s)))$$

$$f'''(s) = \frac{d^2 f(s)}{ds^2} = \varphi''(s)((z_x - x(s))\sin(\varphi(s)) - (z_y - y(s))\cos(\varphi(s))) +$$

$$\varphi'(s)((z_x - x(s))\cos(\varphi(s))\varphi'(s) + (z_y - y(s))\sin(\varphi(s))\varphi'(s))$$

where it follows from the definition of road heading $\varphi(s)$, see (2), that $$\varphi'(s) = \frac{d\varphi(s)}{ds} = \kappa_0 + \kappa_1 s$$

$$\varphi''(s) = \frac{d\varphi(s)}{ds} = \kappa_1$$

Where the minimum of $f(s)$ is attained, we have $f'(s)=0$, and thus a solution to the minimization problem can be found by applying a root-finding algorithm to $f'(s)$. Given an initialization $s^0$, the following iterations can be applied until convergence, Newton's method: $s^{i+1} = s^i - \dfrac{f'(s^i)}{f''(s^i)}$ Halley's method: $s^{i+1} = s^i - \dfrac{2f'(s^i)f''(s^i)}{2(f''(s^i))^2 - f'(s^i)f'''(s^i)}$ Note that the above solution to finding $\hat{s}$ requires knowing the road segment parameters ($x_0$, $y_0$, $\varphi_0$, $k_0$, $k_1$). However, in reality these are unknown. In a sequential solution, given a measurement at time step k, it is suggested to solve for $\hat{s}$ using the estimates of the road segment parameters from time step k−1. In a batch solution, it is suggested to iteratively refine the associations for one timestep at a time, within the batch time-window, until convergence.

Figure 11:
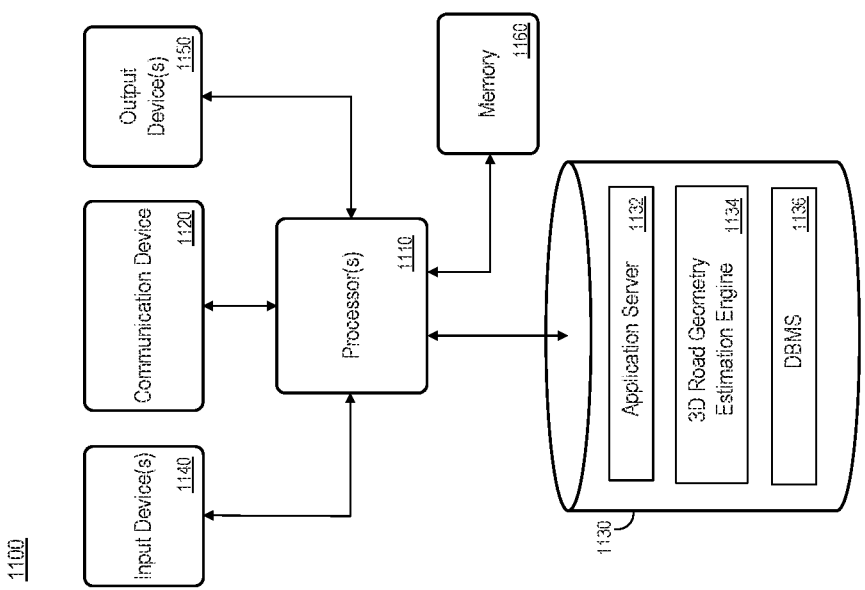
FIG. 11 an illustrative block diagram of a computing system, in accordance with an example embodiment.

FIG. 11 illustrates a computing system 1100 that may be used in any of the architectures or frameworks (e.g., FIG. 1) and processes (e.g., FIG. 9) disclosed herein, in accordance with an example embodiment. FIG. 11 is a block diagram of computing device 1100 embodying an event processor, according to some embodiments. Computing system 1100 may comprise a general-purpose computing apparatus and may execute program code to perform any of the functions described herein. Computing system 1100 may include other unshown elements according to some embodiments.

Computing system 1100 includes processing unit(s) 1110 operatively coupled to communication device 1120, data storage device 1130, one or more input devices 1140, one or more output devices 1150, and memory 1160. Communication device 1120 may facilitate communication with external devices, such as an external network, a data storage device, or other data source. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into computing system 1100 (e.g., a manual request for a specific set of AV operation associated data). Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Application server 1132 may each comprise program code executed by processor(s) 1110 to cause computing system 1100 to perform any one or more of the processes described herein. Embodiments are not limited to execution of these processes by a single computing device. Data storage device 1130 may also store data and other program code for providing additional functionality and/or which are necessary for operation of computing system 1100, such as device drivers, operating system files, etc. The 3D road geometry estimation engine 1134 may include program code executed by processor(s) 1110 to determine, in response to input sensor data (e.g., lidar data and camera data) a 3D road geometry of the road an AV is travelling (i.e., operating) on. Results generated by the 3D road geometry estimation engine 1134 may be stored in a database management system node 1136.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A vehicle computing system, comprising:
a memory storing computer instructions;
a data storage device storing sensor data associated with operation of a vehicle including data captured by at least a first sensor of the vehicle; and
a processor communicatively coupled with the memory to execute the instructions and during operation of the vehicle, capable of:
identifying lane line data associated with a road within the sensor data;
modelling a geometry of the road as a sequence of road segments, the road being defined by an initial position specified by parameters including an initial heading, an initial curvature, and an initial location defined by a three-dimensional position, and each road segment being defined by parameters including a curvature rate and a road grade rate;
generating, based on a mathematical representation of the modelled road geometry, an approximation of a geometry of each road segment; and
generating, based on the generated approximation of the geometry of each road segment, a three-dimensional representation of the road including the sequence of segments.

2. The system of claim 1, wherein the curvature of each segment is specified as one of a straight segment having a zero curve rate, a curve segment having a constant non-zero curve rate, and a transition segment between a straight segment and a curve segment having a linearly changing curve rate.

3. The system of claim 1, wherein the sensor data comprises at least one of radar data generated by a radar onboard the vehicle, lidar data generated by a lidar onboard the vehicle, and camera data generated by a camera onboard the vehicle.

4. The system of claim 1, wherein the three-dimensional position defining the initial location is specified by Cartesian coordinates and the mathematical representation of the modelled road geometry is specified by Fresnel integrals.

5. The system of claim 1, wherein the three-dimensional representation of the road includes a continuous configuration of the sequence of segments.

6. The system of claim 5, wherein consecutive segments in the continuous configuration of the sequence of segments have equal values for curvature, heading, and position at a junction of the consecutive segments.

7. The system of claim 1, wherein the generated three-dimensional representation of the road includes an estimated location of at least one of a lane line of the road, a barrier in a vicinity of the road, a drivable surface of the road, an edge of the road, and a location of an object in a vicinity of the road.

8. A method comprising:
identifying lane line data associated with a road within sensor data captured by at least a first sensor of a vehicle;
modelling a geometry of the road as a sequence of road segments, the road being defined by an initial position specified by parameters including an initial heading, an initial curvature, and an initial location defined by a three-dimensional position, and each road segment being defined by parameters including a curvature rate and a road grade rate;
generating, based on a mathematical representation of the modelled road geometry, an approximation of a geometry of each road segment; and
generating, based on the generated approximation of the geometry of each road segment, a three-dimensional representation of the road including the sequence of segments.

9. The method of claim 8, wherein the curvature of each segment is specified as one of a straight segment having a zero curve rate, a curve segment having a constant non-zero curve rate, and a transition segment between a straight segment and a curve segment having a linearly changing curve rate.

10. The method of claim 8, wherein the sensor data comprises at least one of radar data generated by a radar onboard the vehicle, lidar data generated by a lidar onboard the vehicle, and camera data generated by a camera onboard the vehicle.

11. The method of claim 8, wherein the three-dimensional position defining the initial location is specified by Cartesian coordinates and the mathematical representation of the modelled road geometry is specified by Fresnel integrals.

12. The method of claim 8, wherein the three-dimensional representation of the road includes a continuous configuration of the sequence of segments.

13. The method of claim 12, wherein consecutive segments in the continuous configuration of the sequence of segments have equal values for curvature, heading, and position at a junction of the consecutive segments.

14. The method of claim 8, wherein the generated three-dimensional representation of the road includes an estimated location of at least one of a lane line of the road, a barrier in a vicinity of the road, a drivable surface of the road, an edge of the road, and a location of an object in a vicinity of the road.

15. A non-transitory medium having processor-executable instructions stored thereon, the medium comprising:
    instructions to identify lane line data associated with a road within the sensor data captured by at least a first sensor of a vehicle;
    instructions to model a geometry of the road as a sequence of road segments, the road being defined by an initial position specified by parameters including an initial heading, an initial curvature, and an initial location defined by a three-dimensional position, and each road segment being defined by parameters including a curvature rate and a road grade rate;
    instructions to generate, based on a mathematical representation of the modelled road geometry, an approximation of a geometry of each road segment; and
    instructions to generate, based on the generated approximation of the geometry of each road segment, a three-dimensional representation of the road including the sequence of segments.

16. The medium of claim 15, wherein the curvature of each segment is specified as one of a straight segment having a zero curve rate, a curve segment having a constant non-zero curve rate, and a transition segment between a straight segment and a curve segment having a linearly changing curve rate.

17. The medium of claim 15, wherein the sensor data comprises at least one of radar data generated by a radar onboard the vehicle, lidar data generated by a lidar onboard the vehicle, and camera data generated by a camera onboard the vehicle.

18. The medium of claim 15, wherein the three-dimensional position defining the initial location is specified by Cartesian coordinates and the mathematical representation of the modelled road geometry is specified by Fresnel integrals.

19. The medium of claim 15, wherein the three-dimensional representation of the road includes a continuous configuration of the sequence of segments.

20. The medium of claim 19, wherein consecutive segments in the continuous configuration of the sequence of segments have equal values for curvature, heading, and position at a junction of the consecutive segments.

* * * * *